United States Patent
Merritt et al.

(10) Patent No.: US 8,516,957 B1
(45) Date of Patent: Aug. 27, 2013

(54) MEASURING DISTANCE FOR BALE SIZE IN A ROUND BALER

(75) Inventors: John H. Merritt, Vero Beach, FL (US); Fred M. Horchler, Lancaster, PA (US)

(73) Assignee: CNH America, LLC, New Holland, PA (US)

( * ) Notice: Subject to any disclaimer, the term of this patent is extended or adjusted under 35 U.S.C. 154(b) by 0 days.

(21) Appl. No.: 13/587,549

(22) Filed: Aug. 16, 2012

(51) Int. Cl.
*B30B 5/04* (2006.01)
*A01D 39/00* (2006.01)

(52) U.S. Cl.
USPC ............................................. 100/88; 56/341

(58) Field of Classification Search
USPC .................................... 100/4, 88, 89; 56/341
See application file for complete search history.

(56) References Cited

U.S. PATENT DOCUMENTS

| | | | |
|---|---|---|---|
| 4,924,405 A | 5/1990 | Strosser et al. | |
| 5,226,359 A | 7/1993 | Rempe | |
| 5,551,218 A | 9/1996 | Henderson et al. | |
| 5,783,816 A | 7/1998 | McPherson | |
| H1819 H * | 12/1999 | Anderson et al. | 56/341 |
| 6,708,478 B1 | 3/2004 | Mesmer et al. | |
| 6,874,412 B1 | 4/2005 | Glaszcz et al. | |
| 7,222,566 B2 | 5/2007 | Biziorek | |
| 7,437,866 B2 | 10/2008 | Smith et al. | |
| 7,913,482 B2 * | 3/2011 | Olander et al. | 56/341 |
| 2007/0175198 A1 | 8/2007 | Viaud et al. | |

FOREIGN PATENT DOCUMENTS

DE 10011158 A1 9/2001

\* cited by examiner

*Primary Examiner* — Jimmy T Nguyen
(74) *Attorney, Agent, or Firm* — Patrick M. Sheldrake

(57) ABSTRACT

A non-contacting bale size sensor for an agricultural round baler having bale-forming chamber partially defined by a plurality of continuous side-by-side belts trained around a plurality of fixed guide rolls and at least one moveable roll connected to a belt take up arm. The bale size sensor detects the position of the belt take up arm by measuring distance between a fixed position and the take up arm and a connected control unit determines the size of the bale within the bale-forming chamber.

14 Claims, 4 Drawing Sheets

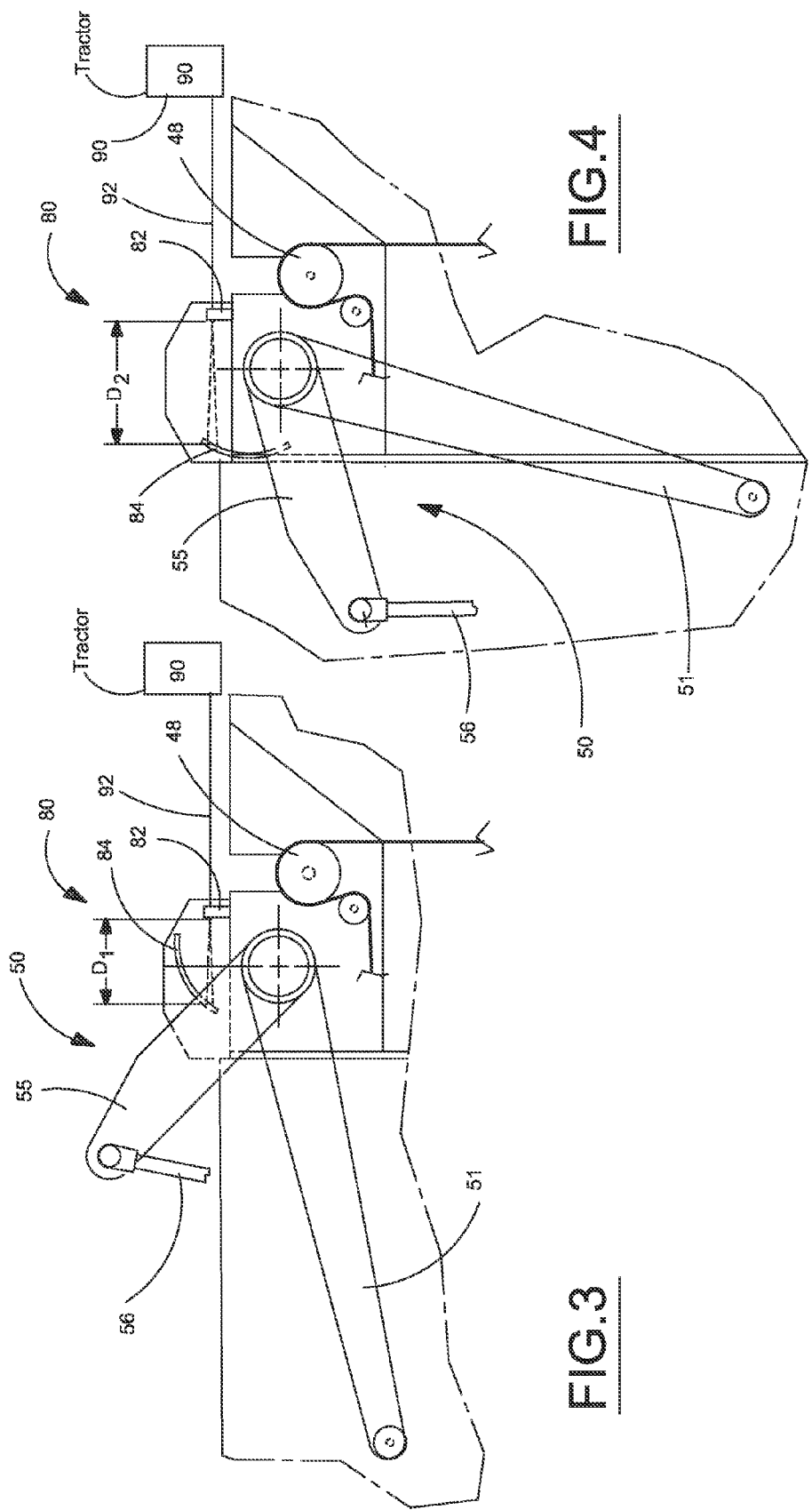

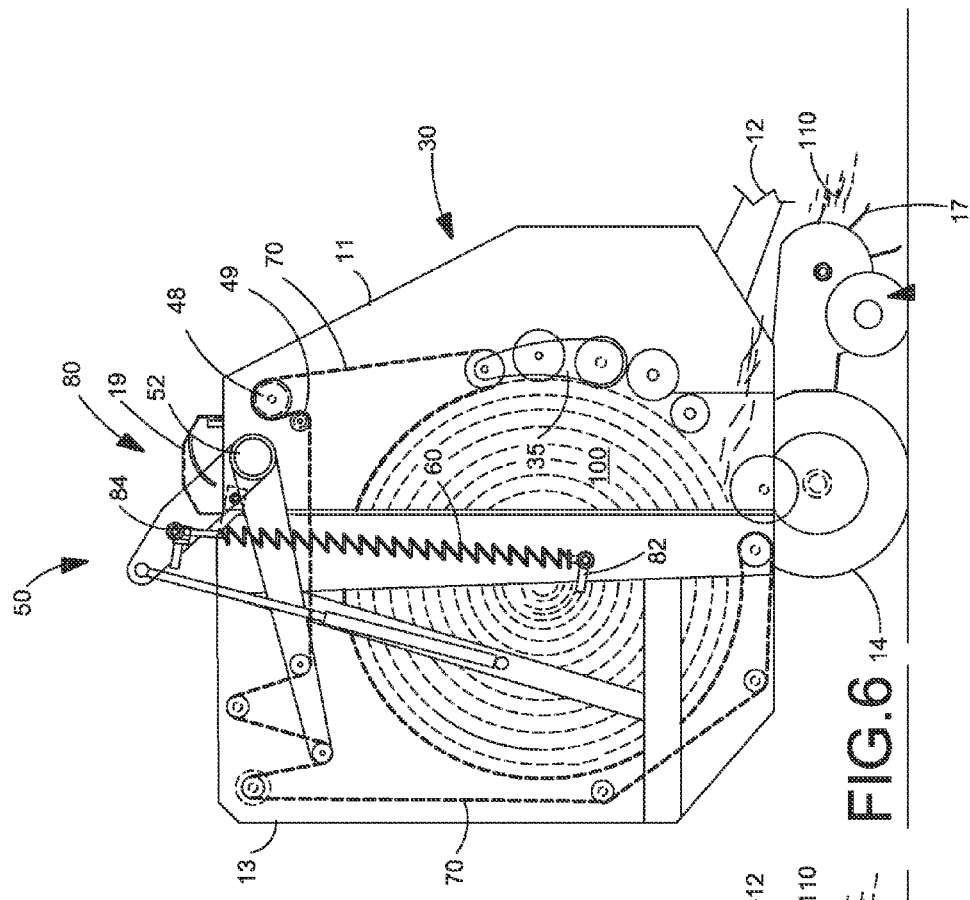
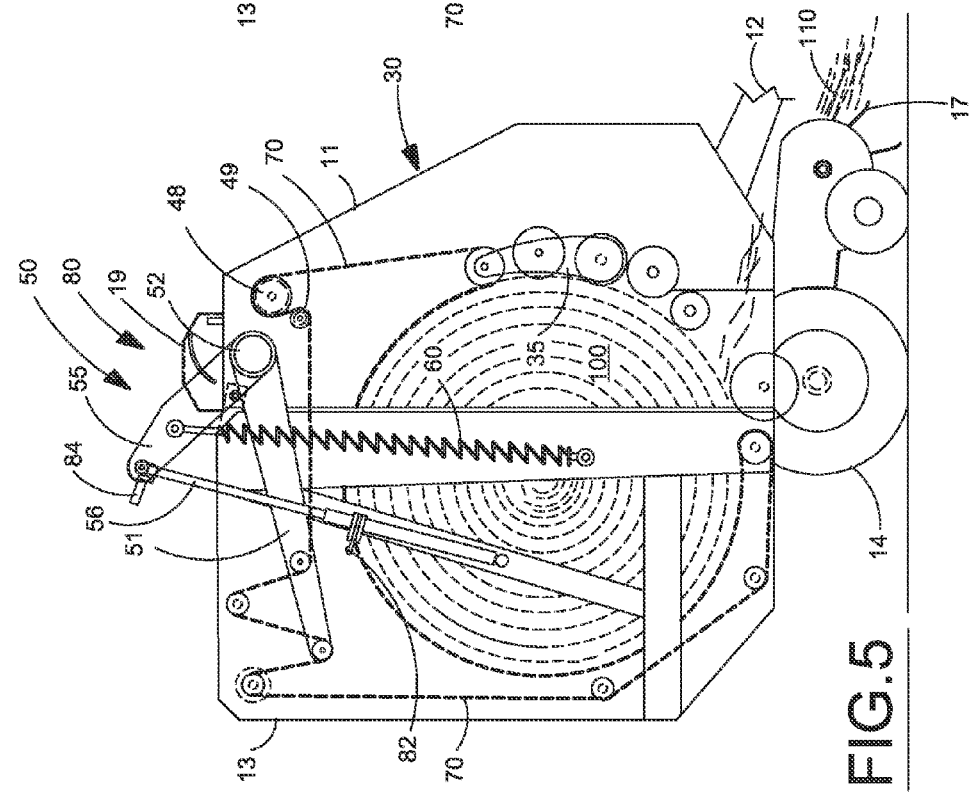

US 8,516,957 B1

MEASURING DISTANCE FOR BALE SIZE IN A ROUND BALER

FIELD OF THE INVENTION

The present invention relates generally to agricultural round balers which form cylindrical bales using one or more movable belts and/or rollers disposed in a bale-forming chamber and, more particularly to an improved system for monitoring the size of the bale formed therein.

BACKGROUND OF THE INVENTION

Round balers have become quite prevalent for their capability of producing a conveniently sized cylindrical bale, very often automatically wrapped with a sheeting material such as net or film. Crop material, such as hay, is picked up from the ground as the baler travels across the field, and is fed into an expandable chamber where it is rolled up to form a compact cylindrical hay package.

Round balers generally have an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms multiple guide rolls are journalled. A biasing force is applied on the take up arms to urge the outer surfaces of the guide rolls against the belts to maintain belt tension and prevent slack from occurring in the belts during expansion and contraction of the chamber.

Modern round balers often sub-systems to monitor and control movement of the belts to produce bales of a desired size, shape uniformity, or density. Bale size monitoring is commonly accomplished through the use of potentiometers connected to the take up arms by mechanical linkages. As the bale grows in the chamber moving the take up arms, pivoting links transfer the take up arm movement to one or more potentiometers which produce an electrical signal indicative of bale size to the control/monitoring processor.

The signals indicative of bale size are frequently imprecise and can lead to problems in the baling cycle. Inherent free play in the linkage and flexure in the potentiometer mountings causes much of the imprecision. Linkages and/or potentiometers are easily damaged in the operating confines of the baler housing by contact with flying debris or nearby moving hydraulic hoses. The operating environment inside the baler housing is less than ideal for sensitive potentiometers which generally reduces their anticipated operating lifespan.

It would be desirable to provide a sensing apparatus that would provide a reliable indication of bale size based upon position of the take up arms. Additional advantages would be realized by a sensing apparatus that reduce the likelihood of bale size mis-indication due to damage or mal-adjustment of a mechanical linkage. Still further advantages would be realized by a bale size sensing apparatus that could be easily incorporated into existing round baler belt take up apparatus with minimal alteration of the existing baler.

SUMMARY OF THE INVENTION

Accordingly, the present invention, in any of the embodiments described herein, may provide one or more of the following advantages:

It is an object of the present invention to provide an improved sensing device for monitoring bale size in an agricultural round baler that utilizes non-contacting means for determining bale chamber take up arm position.

It is a further object of the present invention to provide an improved agricultural round baler bale size sensing apparatus using optical or infared sensors to monitor position of the belt take up arms in order to determine the size of the bale in the chamber. The sensor is fixed in a protected area and aligned to view a target affixed to the take up arms or other element of the belt take up mechanism. As the belt tensioning system moves to conform with the changing size of the bale within, the sensor detects take up arm movement which may be correlated to bale size by the control system.

It is a still further object of the present invention to provide an improved agricultural round baler bale size sensing apparatus using non-contacting optical or infrared sensors to monitor position of the extension of a hydraulic bale tension cylinder connected belt take up arms in order to determine the size of the bale in the chamber. A sensor is fixed in a protected area adjacent to a fixed end of the cylinder and aligned to view a target affixed adjacent to a movable portion of the cylinder. As the tension cylinder extends or retracts to conform with the changing size of the bale within, the sensor detects the extension length of the cylinder which may be correlated to bale size by the control system.

It is a still further object of the present invention to provide an improved sensor apparatus for sensing bale size in an agricultural round baler that is durable in construction, inexpensive of manufacture, carefree of maintenance, easily assembled, and simple and effective to use.

These and other objects are achieved according to the instant invention by providing a non-contacting bale size sensor for an agricultural round baler having bale-forming chamber partially defined by a plurality of continuous side-by-side belts trained around a plurality of fixed guide rolls and at least one moveable roll connected to a belt take up arm. The bale size sensor detects the position of the belt take up arm by measuring distance between a fixed position and the take up arm and a connected control unit determines the size of the bale within the bale-forming chamber.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a detail view of a bale size sensor incorporating one embodiment of the present invention shown in a first position;

FIG. 4 is a detail view of the bale size sensor of FIG. 3 shown in a second position;

FIG. 5; is a second embodiment of the bale size sensor show on a typical round baler; and FIG. 6; is a third embodiment of the bale size sensor.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
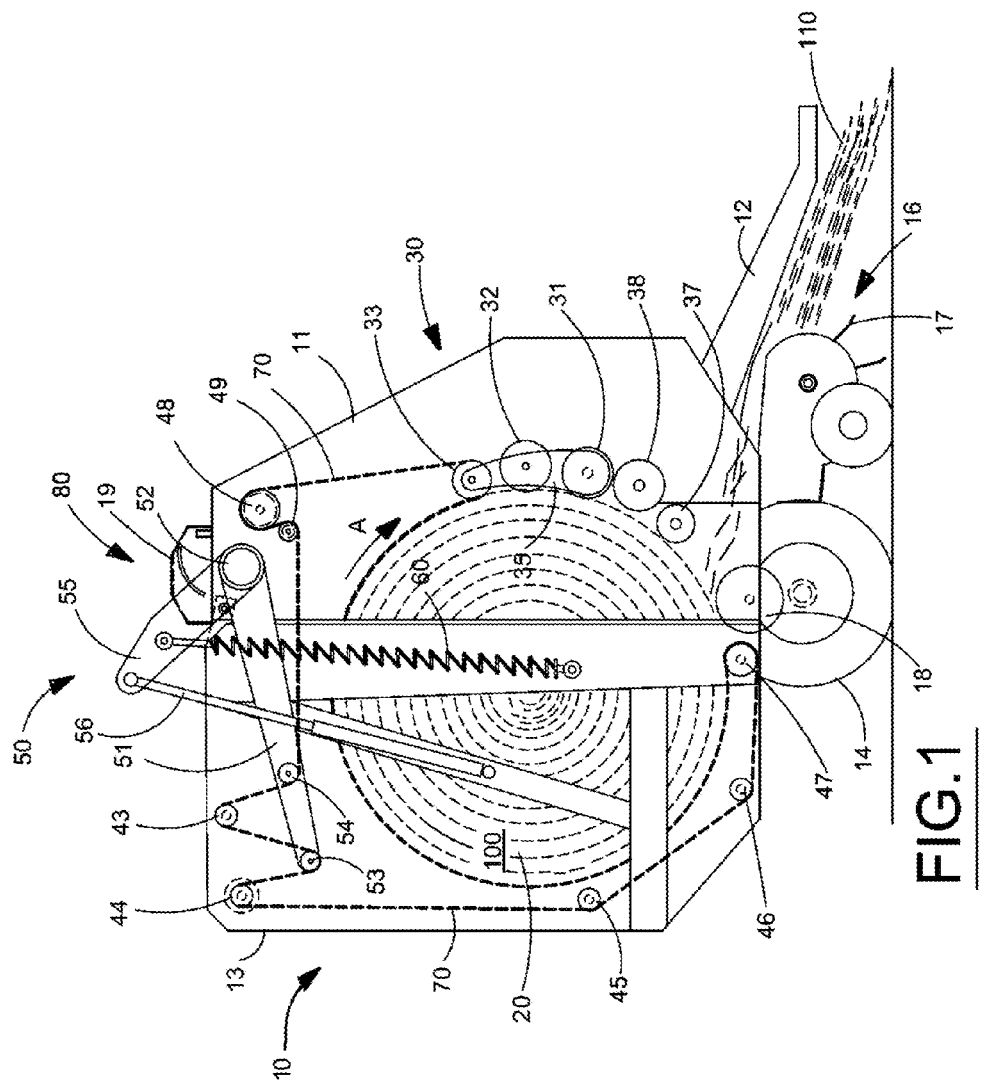
FIG. 1 is a side section view of a typical agricultural round baler on which the present invention is useful, shown with a near-complete bale in the bale chamber.

Referring to the figures, a generally well-known round baler 10 which incorporates the preferred embodiment of the present invention, includes a main frame 11 supported by a pair of wheels 14 (only one shown). A tongue 12 is provided for connection to a tractor. Pivotally connected to the sides of main frame 11 is tailgate 13 which may be closed (as shown in FIG. 1) during bale formation or pivoted open by a tailgate actuator (not shown) to discharge a completed bale 100. A conventional pickup 16, mounted on main frame 11, includes a plurality of tines 17 movable in a predetermined path to lift crop material from the ground and deliver it rearwardly toward the interior of the baler.

Figure 2:
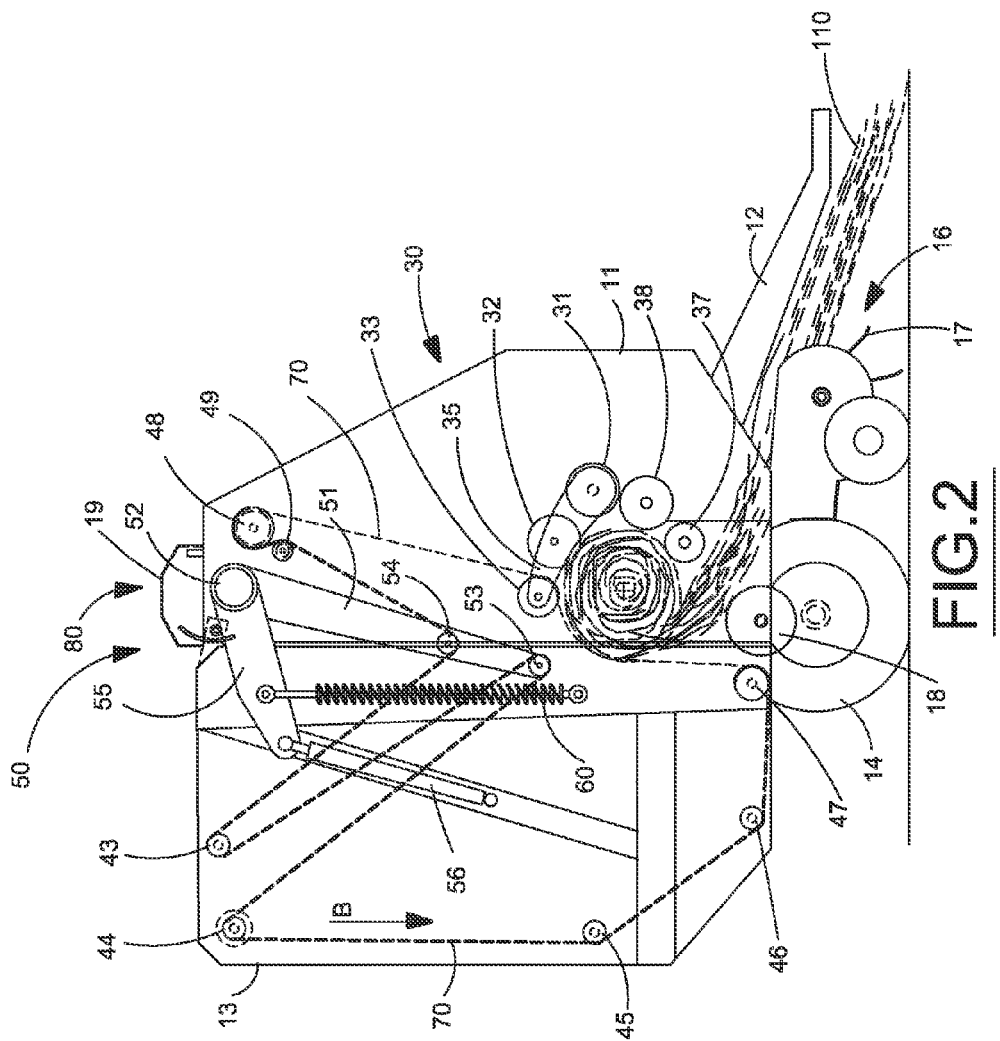
FIG. 2 is a side section view of the round baler of FIG. 1 shown with the bale forming chamber configured at the beginning of a bale forming cycle.

A chamber 20 for forming bales is defined partly by a sledge assembly 30 comprising a plurality of rollers 31, 32 extending transversely in the arcuate arrangement shown in FIGS. 1 and 2. Rollers 31, 32 are journalled at their ends in a pair of spaced apart arms 35, one of which is shown. These arms are pivotally mounted inside main frame 11 on stub shafts for providing movement of sledge assembly 30 between the bale starting position shown in FIG. 2 and the full bale position shown in FIG. 1. Rollers 31, 32 are typically driven in a clockwise direction by conventional means (i.e., chains and sprockets or gears) connected to and powered by a prime mover. A freely rotatable idler roller 33 is also carried by arms 35. Additional rolls are provided to control movement and position of the bale in the chamber.

The bale forming chamber is further defined by an apron 70 comprising a plurality of continuous side-by-side belts supported by guide rolls 44, 45, 46, 47 rotatably mounted in tailgate 13 and a drive roll 48, mounted on main frame 11. Apron 70 passes between roller 32 on sledge assembly 30 and idler roller 33, and is in engagement only with idler roller 33 and not roller 32 which is located in close proximity to the apron belts to strip crop material from the belts, in addition to its bale forming function. Drive roll 48 is powered via a power take-off from the tractor and a drive train (not shown) which moves apron 70 along its changing path, indicated generally by arrow A in FIG. 1. An additional guide roll 49 ensures proper driving engagement between apron 40 and drive roll 48.

A belt take up assembly 50 comprising a pair of take up arms 51 (only one shown) mounted to pivot conjointly with a cross shaft 52 between outer and inner positions, shown in FIGS. 1 and 2, respectively, and carry additional guide rolls 53, 54 is provided for supporting apron 70 and maintaining it in adjacent contact with the forming bale 100 as the bale size changes (increases) during the baling process. A belt tension lever arm 55 is also affixed to shaft 52 to pivot in conjunction with take up arms 51. A return spring 60 is secured between the baler chassis 11 and tension lever arm 55 to bias the take up assembly 50 toward the bale starting position (shown in FIG. 2) and move the take up arms 51 toward the bale starting position following ejection of a completed bale. A hydraulic bale tension cylinder 56 is mounted between tailgate 13 and take up arms 51 and configured to resist movement of the take up assembly 50 from the bale starting position (FIG. 2) toward the full bale position (FIG. 1).

As is illustrated in FIGS. 1 and 2, movement of the take up assembly 50 relates directly to the size of the bale in the chamber. Monitoring the position of the take-up assembly 50 allows an on-board monitor and or control sub-system to determine the size of the bale contained within. FIGS. 3 and 4 show a first embodiment of a non-contacting position sensor 80 arranged to measure the position of the take-up assembly 50. The position sensor comprises a sensor unit 82 and a target 84. The sensor unit 82 may be an optical laser, infrared, ultrasonic, or any similar non-contacting sensor capable of determining distance to a target or similar structure without a mechanical connection. The target is arranged on a moving element, such as the take-up arms 51, the cross shaft 52, or the tension lever arm 55, so that the distance separating the sensor unit and the target varies as the take-up assembly 50 is moved. The sensor unit 82 is connected to an electronic control unit (ECU) 90 (see details FIGS. 3 and 4) which receives signals from the sensor unit via communication bus 92 and derives the size of the bale in the chamber based upon measure of the position of the take up arms. The ECU 90 may be located on the baler, the tractor, or control elements may be shared between the two locations. Power to the ECU 90 and the sensor unit 82 is typically provided by the tractor towing the baler. The bale size information can them be relayed to an operator display or used in the baler control to signal that the bale has reached a desired size and is ready to be ejected from the baler.

In FIG. 3, the take-up assembly 50 is shown in a first position corresponding to the bale in the chamber being near full size. The separation between the sensor unit 82 and the target 84 is shown as $D_1$. Referring to FIG. 4, the take-up assembly 50 is repositioned as when the bale in the chamber is being started and thus much smaller. The separation between the sensor unit 82 and the target 84 in this second position is shown as $D_2$. In the example figures, D1 is less than D2. In order for the position sensor 80 to function, the distance sensed between the sensor unit 82 and the target 84 must provide a unique value for each unique position of the take-up assembly 50. It is preferable, but not essential, for the sensed distance to vary linearly with changing take-up assembly position.

In alternate embodiments, the position sensor 80 may be positioned adjacent to either the tension cylinder 56 (see FIG. 5) or the take-up arm return spring 60 (FIG. 6). The sensor unit 82 is preferably attached to a stationary point on the baler frame or the tension cylinder while the target 84 is connected to a moveable portion, either on the take-up arm assembly adjacent to the spring connection or the tension cylinder to reduce the risk of damage to electrical leads.

In all embodiments, a housing 19 may be provided to protect the position sensor 80, especially sensor unit 82, from damage during baler operation. Placement of the position sensor 80 requires only clear line-of-sight between the sensor unit 82 and target 84 for operation.

It will be understood that changes in the details, materials, steps and arrangements of parts which have been described and illustrated to explain the nature of the invention will occur to and may be made by those skilled in the art upon a reading of this disclosure within the principles and scope of the inven-

Having thus described the invention, what is claimed is:

1. An agricultural round baler comprising:
   a bale forming chamber defined in a space between opposing frame-supported side walls by a plurality of side-by-side continuous belts trained around a plurality of transversely elongate guide rollers including fixed rollers and at least one moveable roller, said bale forming chamber configured to form a generally spirally wound, cylindrically shaped bale of increasing diameter by motion of said plurality of belts and rotation of said plurality of guide rollers;
   a tension apparatus pivotally moveable between opposing empty and full positions corresponding to the diameter of the bale within said bale-forming chamber and having a return spring to bias said tension apparatus toward said empty position, said at least one moveable roller connected thereto for movement therewith;
   at least one non-contact distance sensor connected to a baler frame adjacent to said tension apparatus; and
   a sensor target movable with said tension apparatus, wherein said at least one non-contact distance sensor and said sensor target are positioned to detect a position of said tension apparatus by non-contacting measure of distance between said at least one distance sensor and a sensing location on said tension apparatus.

2. The round baler of claim 1, wherein said distance sensor being arranged to detect the position of said tension apparatus by non-contacting measure of distance between said at least one distance sensor and said sensor target.

3. The round baler of claim 2, further comprising a control unit configured to receive a signal indicative of said tension apparatus distance from said distance sensor and derive a size value representative of a bale within said bale-forming chamber.

4. The round baler of claim 3, wherein said distance sensor is an optical laser.

5. The round baler of claim 3, wherein said distance sensor is an infrared sensor.

6. The round baler of claim 3, wherein said distance sensor is an ultrasonic sensor.

7. The round baler of claim 3, further comprising an elongate, hydraulic bale tension cylinder having generally opposing first and second ends, said first end being connected to said tension apparatus, said second end being connected to said frame, said tension cylinder moveable between generally opposing first and second positions as said tension apparatus moves between said empty and full positions, said sensor target connected adjacent to said first end, said distance sensor connected to said second end.

8. A bale size measuring apparatus for an agricultural round baler having a bale forming chamber defined in a space between opposing frame-supported side walls by a plurality of side-by-side continuous belts trained around a plurality of transversely elongate guide rollers including fixed rollers and at least one moveable roller, the bale forming chamber configured to form a generally spirally wound, cylindrically shaped bale of increasing diameter by motion of the plurality of belts and rotation of the plurality of guide rollers, said bale size measuring apparatus comprising:
   a tension apparatus pivotally moveable between opposing empty and full positions corresponding to the diameter of the bale within the bale-forming chamber and having a return spring to bias said tension apparatus toward said empty position, said tension apparatus having a radially extending tension arm with said at least one moveable roller connected thereto for movement therewith;
   at least one non-contact distance sensor connected to a baler frame adjacent to said tension apparatus and
   a sensor target movable with said tension apparatus, wherein said at least one non-contact distance sensor and said sensor target being located to detect a position of said tension apparatus by non-contacting measure of distance between said at least one distance sensor and a sensing location on said tension apparatus.

9. The measuring apparatus of claim 8, wherein said distance sensor being arranged to detect the position of said tension apparatus by non-contacting measure of distance between said at least one distance sensor and said sensor target.

10. The measuring apparatus of claim 9, wherein said distance sensor is an optical laser.

11. The measuring apparatus of claim 9, wherein said distance sensor is an infrared sensor.

12. The measuring apparatus of claim 9, wherein said distance sensor is an ultrasonic sensor.

13. The measuring apparatus of claim 9, further comprising a control unit configured to receive a signal indicative of said tension apparatus distance from said distance sensor and derive a size value representative of a bale within said bale-forming chamber.

14. The measuring apparatus of claim 13, further comprising an elongate, hydraulic bale tension cylinder having generally opposing first and second ends, said first end connected to said tension apparatus, said second end connected to said frame, said tension cylinder moveable between generally opposing first and second positions as said tension apparatus moves between said empty and full positions, said sensor target connected adjacent to said first end, said distance sensor connected to said second end.

* * * * *